(12) United States Patent
Denes et al.

(10) Patent No.: US 7,510,632 B2
(45) Date of Patent: Mar. 31, 2009

(54) PLASMA TREATMENT WITHIN DIELECTRIC FLUIDS

(75) Inventors: Ferencz S. Denes, Madison, WI (US); Sorin O. Manolache, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 861 days.

(21) Appl. No.: 10/526,798

(22) PCT Filed: Sep. 4, 2003

(86) PCT No.: PCT/US03/27645

§ 371 (c)(1), (2), (4) Date: Mar. 7, 2005

(87) PCT Pub. No.: WO2004/024316

PCT Pub. Date: Mar. 25, 2004

(65) Prior Publication Data

US 2006/0054489 A1 Mar. 16, 2006

Related U.S. Application Data

(60) Provisional application No. 60/409,805, filed on Sep. 10, 2002.

(51) Int. Cl.
*B01J 19/08* (2006.01)
(52) U.S. Cl. ..................... 204/165; 204/168
(58) Field of Classification Search ............... 204/165, 204/168
See application file for complete search history.

(56) References Cited

U.S. PATENT DOCUMENTS 3,976,726 A 8/1976 Johnson
5,517,975 A 5/1996 Iwata
5,683,586 A 11/1997 Harcourt et al.
6,284,105 B1 9/2001 Eliasson et al.
2003/0146310 A1* 8/2003 Jackson .................. 239/690

FOREIGN PATENT DOCUMENTS

| EP | 0 054 934 A | 6/1982 |
| EP | 0054934 A1 | 6/1982 |
| GB | 2346176 A | 8/2000 |
| JP | 2002 061556 A | 2/2002 |
| WO | WO 93 1431 A1 | 7/1993 |
| WO | WO 96 23138 A1 | 8/1996 |
| WO | WO 99/47230 B | 9/1999 |
| WO | WO 99 53186 A1 | 10/1999 |
| WO | WO 03/76790 A | 9/2003 |
| WO | WO 03 076790 A1 | 9/2003 |

* cited by examiner

*Primary Examiner*—Kishor Mayekar
(74) *Attorney, Agent, or Firm*—Craig A. Fieschko, Esq.; DeWitt Ross & Stevens S.C.

(57) ABSTRACT

A dielectric liquid having entrained bubbles of gas or vapor is subjected to an electric field applied between spaced electrodes (112, 116) which generates microdischarges (and thus plasma) within the bubbles, allowing modification of the properties of the dielectric liquid. The invention is particularly useful for treating hydrocarbon liquids such as gasolines and other liquid hydrocarbon fuels, which have extremely low dielectric constants. Generating microdischarges within bubbles in such fuels can create compounds useful for higher combustion efficiency and/or lower emissions in internal combustion engines. The invention may be directly implemented in an engine's fuel line upstream from the combustion chamber (e.g., immediately prior to a fuel injector), thereby allowing the invention to be usefully implemented for fuel treatment prior to combustion.

20 Claims, 1 Drawing Sheet

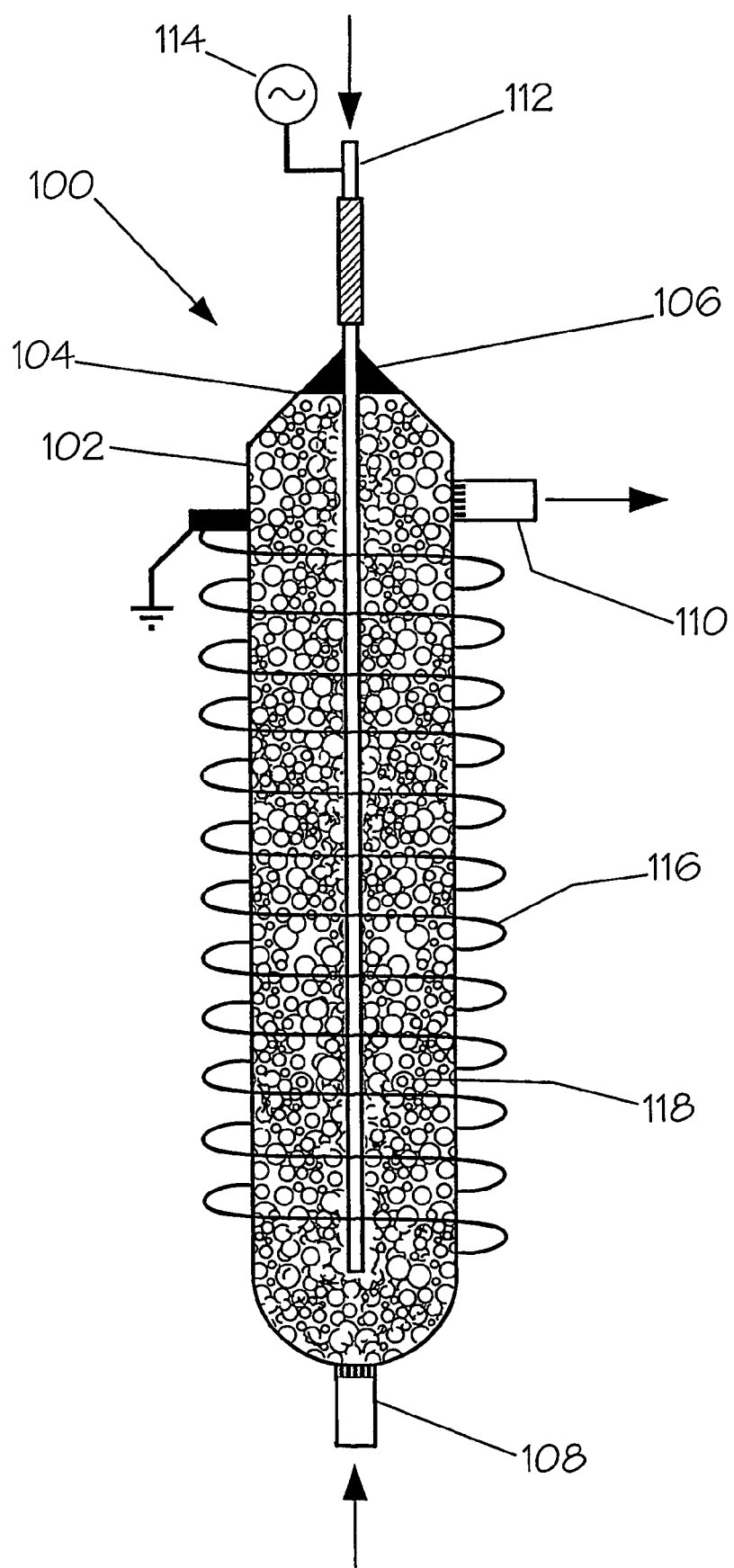

PLASMA TREATMENT WITHIN DIELECTRIC FLUIDS

CROSS-REFERENCE TO RELATED APPLICATIONS

This application is a 371 of PCT/US03/27645, filed Sept. 04, 2003, which claims benefit of 60/409,805, filed Sept. 10, 2002.

STATEMENT REGARDING FEDERALLY SPONSORED REASEARCH

This invention was made with United States government support awarded by the following agencies:
USDA/CSREES Grant No(s).: 02-CHRF-0-6055
The United States government has certain rights in this invention.

FIELD OF THE INVENTION

This document concerns an invention relating generally to plasma generators, and more specifically to "cold" plasma generators and/or plasma generators operating at atmospheric pressure, and more specifically to plasma treatment within dielectric fluids.

BACKGROUND OF THE INVENTION

Plasma, the fourth state of matter, consists of gaseous complexes in which all or a portion of the atoms or molecules are dissociated into free electrons, ions/cations, free radicals, and neutral particles. On earth, plasma occurs naturally in lightning bolts, flames, and similar phenomena, or may be manufactured by heating a gas to high temperatures, or by applying a strong electric field to a gas, the more common method. The latter type of plasma, often referred to as an electrical discharge plasma, can be further subclassified as a "hot" plasma, i.e., dissociated gas in thermal equilibrium at high temperatures (~5000 K), or "cold" plasma, i.e., nonthermal plasma wherein the dissociated gas is at low temperatures but its electrons are at high temperature (i.e., in a state of high kinetic energy).

The usefulness of plasma for manufacturing and other applications is best understood by reviewing common applications for cold plasma. As an example, common cold plasma processing methods are commonly used to alter the surface properties of industrial materials without affecting the bulk properties of the treated material. The most common cold plasma surface treatments may be generally categorized as cleaning, activation, grafting, and deposition processes, each of which will now be briefly reviewed.

Plasma cleaning processes typically utilize inert or oxygen plasmas (i.e., plasmas generated from inert or oxygen-based process gases) to remove contaminants (generally organic contaminants) on a material surface subjected to vacuum. The contaminants are exposed to a plasma stream, and they undergo repetitive chain scission from the plasma until their molecular weight is sufficiently low to boil away in the vacuum.

Plasma activation is used when a material (generally a polymer or elastomer) is subjected to a plasma generally produced from an inert or non-carbon gas, and results in the incorporation of different moieties of the process gas onto the surface of the material being treated. For example, the surface of polyethylene normally consists solely of carbon and hydrogen. However, if subjected to an appropriate plasma, the surface may be activated to contain a variety of functional groups which enhance the adhesion and permanence of coatings later applied to the surface. As an example, a surface can be treated to greatly enhance its ability to bond with adhesives.

Deposition, which is exemplified by a process referred to as plasma-enhanced chemical vapor deposition (PECVD), utilizes a complex molecule as the process gas. The process gas molecules are decomposed near the surface to be treated, and recombine to form a material which precipitates onto and coats the surface.

Grafting generally utilizes an inert process gas to create free radicals on the material surface, and subsequent exposure of the radicalized surface to monomers or other molecules will graft these molecules to the surface.

The foregoing cold plasma processes have numerous practical applications, including sterilizing of medical equipment, application of industrial and commercial coatings, etching computer chips, semiconductors, and circuits, and so forth. Hot plasma might be used for generally the same types of applications as cold plasma. However, hot plasma applications are limited since most organic matter cannot be treated under the high temperatures required for hot plasmas without severe degradation. Additionally, hot plasma technology is energy and equipment intensive, making it expensive and difficult to work with. In contrast, cold plasma may be used at temperature ranges as low as room temperature (or lower), making it significantly easier to handle. However, cold plasma processes have the disadvantage that they generally need low pressure conditions to operate (generally a vacuum), and consequently need large, static (i.e., immobile) equipment with a low-pressure treatment chamber to operate. This causes significant manufacturing constraints since the need to treat items within an enclosed chamber makes it inherently difficult to process the items continuously in assembly-line fashion, as opposed to processing the items in batches.

Some of these difficulties have been overcome with further developments in dielectric barrier discharge (DBD) plasma production processes. These processes, which may take place at room temperature and non-vacuum conditions, have a gas-filled cavity insulated from an opposing pair of electrodes by one or more dielectric layers. When an alternating high voltage electrical current is applied to the electrodes, "microdischarges" occur within the gas(es) in the cavity between the electrodes and dielectric layers, thereby generating plasma. DBD apparata are sometimes used to generate ozone by ionizing oxygen passing through the cavity of the apparatus, or to break apart volatile gaseous organic compounds passing through the cavity.

However, conventional DBD plasma generation apparata are limited in several respects. One important limitation of prior DBD apparata is that they are generally adapted for plasma treatment of the gas situated within or passing through the cavity, or of solid workpieces situated within or passing through the gas-filled cavity. DBD apparata are generally not regarded as being suitable for the plasma treatment of liquid-phase materials, primarily because filamentary or "streamer-type" discharges occur in the liquids instead of microdischarges, producing significant heat and leading to unwanted effects (e.g., generation of carbon in hydrocarbon process liquids). Additionally, treatment efficiency is low because such discharges only affect liquid resting along the discharge path, as opposed to the more widespread treatment effected by microdischarges (which are dispersed about the cavity between the electrodes). As a result, plasma reactions in liquids are generally performed using specialized apparata such as that described in U.S. Pat. Nos. 5,908,539 and 5,534,232.

Conventional DBD plasma generation also has the disadvantage that throughput of treated workpieces (or treated gases) is limited by the allowable size of the cavity through which they must pass, and the cavity is generally quite small owing to the need for close spacing of the electrodes (and with the cavity space being further reduced by the presence of the dielectric layers, which are generally made of ceramic material). Thus, while the advantages of DBD plasma generation are compelling, it has only gained widespread acceptance in a limited number of fields. As a result, there has long been a desire for methods and apparata which provide the benefits of DBD plasma treatment, but which enhance its versatility.

SUMMARY OF THE INVENTION

To give the reader a basic understanding of some of the advantageous features, of the invention, following is a brief summary of preferred versions of the invention. As this is merely a summary, it should be understood that more details regarding the preferred versions may be found in the Detailed Description set forth elsewhere in this document. The claims set forth at the end of this document then define the various versions of the invention in which exclusive rights are secured.

The invention involves methods and apparata for plasma treatment of a dielectric liquid having entrained bubbles of gas or vapor. The dielectric liquid is subjected to an electric field which generates microdischarges (and thus plasma) within the bubbles. As will be discussed at greater length elsewhere in this document, the invention is particularly useful for treating hydrocarbon liquids such as gasolines and other liquid hydrocarbon fuels, which have extremely low dielectric constants. Generating microdischarges within bubbles in such fuels can create compounds useful for higher combustion efficiency and/or lower emissions in internal combustion engines. Since the invention may be directly implemented in an engine's fuel line upstream from the combustion chamber (e.g., immediately prior to a fuel injector), the invention can be usefully implemented for fuel treatment prior to combustion.

The electric field may be generated in a manner conventional to DBD apparata, i.e., by providing electrodes spaced by a cavity, with the electrodes being stimulated at a voltage and frequency sufficient to generate plasma within gas situated in the cavity. The dielectric liquid (with entrained bubbles) may then be passed through or situated within the cavity, and plasma generation will occur in the bubbles via microburst generation. Alternatively, it has been found that when spaced electrodes are separated by an insulator and a dielectric liquid is situated adjacent (but not between) the electrodes, DBD plasma generation may still occur within bubbles in the dielectric liquid if the liquid and electrodes are appropriately located relative to each other (particularly if the spacing between each electrode and the adjacent liquid is less than the spacing between the adjacent electrodes). This arrangement, which may also be used for treatment of purely gas-phase process fluids, is useful where restricting the flow of the fluid to be processed through a cavity is too limiting.

The bubbles may be generated mechanically (e.g., by creating turbulence within the liquid from centrifugation or other agitation, subjecting the liquid to ultrasonic excitation sufficient to cause cavitation, etc.); chemically (as a product of a reaction within the dielectric liquid); or by inducing a change of phase in the dielectric liquid (by increasing temperature and/or decreasing pressure to a degree sufficient to cause bubbles of vapor to form in the dielectric liquid).

The invention has numerous applications for the treatment of dielectric liquids, of gases or vapors entrained within dielectric liquids, and/or of materials which come into contact with the dielectric liquids and gas/vapor bubbles entrained therein. However, one application which is presently of particular interest is the use of the invention for treatment of hydrocarbon fuels. The invention may be implemented in the fuel line for an internal combustion engine at a location upstream from a fuel injector by situating electrodes about the fuel line, and stimulating the electrodes at a voltage and frequency sufficient to generate plasma within any gas bubbles within the liquid fuel supplied to the fuel injector. Gas bubbles may be easily generated by heating the fuel line using heat from the engine block to generate vapor bubbles within the liquid fuel, or exhaust gas may be introduced into the fuel line. With appropriate selection of voltage, frequency and the type and amount of bubbles formed, the fuel may be modified for higher efficiency (higher power output), lower emissions, and/or for other desired effects.

Further advantages, features, and objects of the invention will be apparent from the following detailed description of the invention in conjunction with the associated drawings.

BRIEF DESCRIPTION OF THE DRAWINGS

FIG. 1 is a simplified cross-sectional view of an exemplary reactor apparatus which may be used to implement the invention.

DETAILED DESCRIPTION OF PREFERRED EMBODIMENTS OF THE INVENTION

Introduction: An Exemplary Version of the Invention

Referring to FIG. 1, the reference numeral 100 designates an exemplary version of a reactor apparatus which can be used to implement the invention. The reactor 100 includes a cylindrical jacket 102 made of glass, ceramic, or other dielectric insulating material. The jacket 100 has an upper opening 104 provided with a seal 106, a lower inlet 108, and an upper outlet 110. A tubular stressed (i.e., non-ground) electrode 112 having a high voltage pulsed power supply 114 may be inserted within the jacket 102 to a desired degree by sliding it within the seal 106. An external grounded tubular electrode 116 is wrapped in spiral fashion about the exterior of the jacket 102. (This electrode 116 might instead have larger area and might more continuously surround the jacket 102, as by providing it in the form of a cylinder fitting about the jacket 102, but the spiral form is useful to allow observation of the interior of the jacket 102 when it is provided in transparent form. Additionally, a tubular element can be useful if the electrode 116 carries heating or cooling fluid within its interior or otherwise serves as a heating/cooling element.) The interior of the jacket 102 is filled with dielectric packing beads 118 which have a purpose to be discussed below.

A dielectric liquid may then be provided to the lower inlet 108 to flow to the upper outlet 110. A process gas (if desired) may be introduced into the stressed electrode 112 to cause the process gas to enter the jacket 102 within the dielectric liquid and bubble up through the packing beads 118 toward the top of the jacket 102. Alternatively or additionally, where the dielectric liquid is heated by the electrode 116 (or by other means) to such an extent that vapor bubbles begin to form from the dielectric fluid, these vapor bubbles can serve as process gas. (Within this document, the term "gas" should be understood to encompass vapor, e.g., the gaseous form of substances which are ordinarily liquids at standard atmospheric temperatures and pressures.)

Plasma generation within the bubbles then occurs with appropriate selection of the voltage and frequency at the stressed electrode 112 (and the degree of immersion of the stressed electrode 112 within the jacket 102). The generated plasma may treat the high surface area liquid/gas interface bounding each bubble within the dielectric liquid, and may thereby treat the dielectric liquid or other structures contacting the liquid and bubbles, such as the packing beads 118 or the walls bounding the flow of the dielectric liquid.

The packing beads 118, while not essential, cause the bubbles to travel through the dielectric liquid via a complex route whereby the bubbles contact a greater volume of dielectric liquid, thereby providing a more efficient distribution of plasma species throughout the dielectric liquid. The packing beads 118 may be made of porous materials (e.g. zeolites, molecular thieves, metal oxide powders, etc.) or non-porous materials (glass beads, ceramic structures, etc.), and may be configured to have very large surface areas to better serve as evaporation/nucleation sites for bubbles. Depending on the application, they may also have catalytic properties to achieve desired plasma treatment results.

The treated dielectric liquid is then received at the outlet 110 for subsequent use. The top of the jacket 102 (and/or the outlet 110) may include a gas trap or other outlet for receiving unused or treated process gas, if desired. The jacket 102 may be made easily openable for replacing or refreshing the packing beads 118, and/or for removing packing beads 118 for later use if their plasma treatment was intended.

It is noted that the flow directions and input/output points of the process gas and dielectric liquid may be altered in the foregoing arrangement, e.g., liquid and/or gas could be input via one or more of inlet 108, outlet 110, or electrode 112 to be output through any one or more of these passages which remain to receive output liquid and/or gas. In whatever arrangement that is chosen, it is useful to expose as much liquid as possible to bubbles within the plasma-generating electric field, and thus it will generally be desirable to provide the bubbles with a longer effective path of travel.

Experimental Results

A reactor of table-top size having the same general configuration as reactor 100 was tested using n-octane as the dielectric liquid and argon as the process gas. Plasma treatment successfully resulted from use of a variety of process parameters (plasma parameter range: 10-50 kV, 1-25 kHz, 10-50 W; treatment time: 30 seconds to 5 minutes; atmospheric pressure operation; gas flow rate: 10-100 standard cubic cm per minute (sccm); liquid temperature: 25-40 C).

GC-MS (Gas Chromatography-Mass Spectrometry) analysis was applied to the results of a test run using 1 ml of n-octane as the dielectric fluid, with reactor operating parameters of 20 W, 5 kHz, 1 minute treatment time, 90 sccm argon flow, at room temperature and atmospheric pressure. The GC-MS data illustrated that a complex saturated and unsaturated hydrocarbon (HC) mixture was synthesized, including propane, propene, $C_4$ to $C_7$ derivatives, and higher hydrocarbon homologues of octane such as $C_{10}$ to $C_{15}$. The presence of unsaturated HCs suggests that even lower molecular weight HC derivatives and hydrogen are present among the final reaction products.

The results suggest that the invention could be successfully implemented within the fuel line of an internal combustion engine system to treat fuel prior to injection and produce a higher population of lower carbon/lower molecular weight HCs, thereby enhancing engine efficiency during combustion. While the test results for the aforementioned reactor indicated that higher carbon/higher molecular weight compounds were produced as well, it is believed that many of these resulted from the combination of active species existing after plasma treatment was completed. This suggests that it would be beneficial to minimize the time lapse between plasma treatment of fuel and fuel injection (i.e., the plasma reactor should be provided in the fuel line at or shortly before the injection system).

Other Exemplary Versions of the Invention

It should be understood that the invention can be implemented in reactors operating in either continuous flow or batch mode. Additionally, reactors can assume a wide variety of configurations other than the ones previously discussed, e.g., electrodes can be provided in parallel plate form, co-cylindrical form, or in interleaved arrays of multiple elongated elements, among other forms. One form which may be usefully implemented when it is impractical to situate liquid directly between opposing electrodes is to provide opposing electrodes which are spaced by insulating material, and then situate the liquid adjacent to the electrodes, with the liquid preferably being more closely spaced to the electrodes than the spacing between the electrodes themselves. As an example, a pair of electrodes may be embedded within a ceramic plate with the distance between the electrodes and the plate surface (and the liquid traveling adjacent the plate surface) being less than the distance between the electrodes. It has been found that DBD plasma generation can occur in gases situated adjacent such a plate even though the gas does not rest directly between the electrodes, as is conventional in DBD apparata. This arrangement could therefore be used to generate plasmas in bubbles within dielectric fluids as well. A version of the invention implementing this arrangement can be visualized by considering if the stressed electrode 112 of FIG. 1 was also provided in helical form wound about the outside of the jacket 102 (as with ground electrode 116), with the helices of the stressed electrode 112 and ground electrode 116 spiraling about each other in interwoven (but non-contacting) relationship, and with both electrodes 112 and 116 then being encased in cast ceramic material surrounding the outside of jacket 102. Gas bubbles might then be input from an inlet at or adjacent inlet 108. Since the effectiveness of plasma treatment will diminish in portions of the liquid located more distant from the electrodes 112 and 116, it might in this case be desirable to reduce the diameter of jacket 102 so that all liquid in the jacket 102 is closely spaced in relation to the electrodes 112 and 116. Alternatively, the central axis of the jacket 102 might be occupied by a perforated conduit from which gas bubbles are injected.

Another useful form of reactor provides a porous insulating member inside the jacket 102 so that the interior is fully occupied by the member, but gases and liquids may still flow through it (with the porous lattice of the member enhancing bubble dispersion much as the packing beads 118 did). This version of the reactor could simply take a form similar to that of reactor 100, with the porous member replacing the packing beads 118 and having the stressed electrode 112 embedded therein. Alternatively, both electrodes could be embedded within the porous member inside the jacket 102, with the structural support provided by the porous member potentially allowing for complex electrode structures which might otherwise be difficult or impractical to provide, e.g., electrodes formed as series of extremely long and thin interleaved fingers or plates, electrodes in a double helix configuration spaced from the jacket wall 102 (which might in this case be an electrode itself), etc.

Apart from use of the invention for treatment of fuels within the fuel lines of internal combustion engines, the invention could be used for cracking of hydrocarbons in refinery or other processes, or for processing of hydrocarbons for other applications. The invention could also be used for synthesis of common and novel organic structures from various liquid-phase dielectric precursors (e.g. alcohols, ethers, amines, etc.) and appropriate selection of gases. As one example, the invention could be used for the polymerization of monomers (e.g., vinyl monomers) dissolved in organic solvents or other dielectric liquids by taking advantage of plasma-generated charged (cations, anions) and neutral (free radicals) active species in bubbles. The invention might also be used to apply surface treatments to objects by suspending the objects in the dielectric liquid during plasma treatment, and the liquid may contain dissolved polymers, metals, or other substances desired for use in the surface treatments.

Various preferred versions of the invention are shown and described above to illustrate different possible features of the invention and the varying ways in which these features may be combined. Apart from combining the foregoing features of the invention in varying ways, other modifications are also considered to be within the scope of the invention. The invention is therefore not intended to be limited,: to the foregoing versions, but rather is intended to be limited only by the claims set out below, with the invention encompassing all different versions that fall literally or equivalently within the scope of these claims

What is claimed is:

1. A plasma treatment method comprising the step of subjecting a portion of a fuel line for an internal combustion engine to an electric field, wherein
   a. the fuel line contains a liquid fuel having gas bubbles therein, and
   b. the electric field generates plasma within the bubbles, with the fuel line subsequently providing the liquid fuel to a combustion chamber of the internal combustion engine.

2. The plasma treatment method of claim 1 wherein the interior of the fuel line has obstacles formed therein within the path of fuel flow, whereby the length of the path of fuel flow is made greater than the corresponding length of the fuel line.

3. The plasma treatment method of claim 1 wherein the solid surface area within the interior of the fuel line is greater than the solid surface area of the exterior of the fuel line.

4. The plasma treatment method of claim 1 wherein the fuel line contains beads therein.

5. The plasma treatment method of claim 4 wherein the beads are formed of catalytic materials.

6. The plasma treatment method of claim 1 wherein the gas bubbles contain the liquid fuel in vaporized form.

7. The plasma treatment method of claim 1 wherein the gas bubbles contain exhaust gas emitted by the internal combustion engine.

8. The plasma treatment method of claim 1 further comprising the step of increasing the temperature of the liquid fuel to a degree sufficient to cause the gas bubbles to form in the liquid fuel.

9. The plasma treatment method of claim 1 further comprising the step of reducing the pressure of the liquid fuel to a degree sufficient to cause the gas bubbles to form in the liquid fuel.

10. The plasma treatment method of claim 1 further comprising the step of ultrasonically exciting the liquid fuel to a degree sufficient to cause the gas bubbles to form in the liquid fuel.

11. A plasma treatment method comprising the steps of:
    a. situating a dielectric liquid having gas bubbles therein within an electric field which generates plasma within the gas bubbles; and
    b. providing the dielectric liquid to the combustion chamber of an internal combustion engine.

12. The plasma treatment method of claim 11 wherein the electric field is generated by spaced electrodes which are stimulated at a voltage and frequency sufficient to generate plasma within the gas bubbles.

13. The plasma treatment method of claim 12 wherein the dielectric liquid is situated between the spaced electrodes.

14. The plasma treatment method of claim 12 wherein the dielectric liquid is situated adjacent the spaced electrodes.

15. The plasma treatment method of claim 11 wherein the gas bubbles contain the dielectric liquid in vaporized form.

16. The plasma treatment method of claim 11 wherein the dielectric liquid is a hydrocarbon liquid.

17. The plasma treatment method of claim 11 further comprising the step of increasing the temperature of the dielectric liquid to a degree sufficient to cause the gas bubbles to form in the dielectric liquid.

18. The plasma treatment method of claim 11 further comprising the step of reducing the pressure of the dielectric liquid to a degree sufficient to cause the gas bubbles to form in the dielectric liquid.

19. The plasma treatment method of claim 11 further comprising the step of ultrasonically exciting the dielectric liquid.

20. The plasma treatment method of claim 11 further comprising the step of ultrasonically exciting the dielectric liquid to a degree sufficient to cause the gas bubbles to form in the dielectric liquid.

* * * * *